US008072160B2

(12) United States Patent
Sun et al.

(10) Patent No.: US 8,072,160 B2
(45) Date of Patent: Dec. 6, 2011

(54) LOW POWER NON-ISOLATED DRIVER

(75) Inventors: Chao-Qun Sun, Shanghai (CN); Shi-Hai Zhu, Shanghai (CN)

(73) Assignee: BCD Semiconductor Manufacturing Limited, George Town, Grand Cayman (KY)

( * ) Notice: Subject to any disclaimer, the term of this patent is extended or adjusted under 35 U.S.C. 154(b) by 361 days.

(21) Appl. No.: 12/341,176

(22) Filed: Dec. 22, 2008

(65) Prior Publication Data

US 2010/0156322 A1 Jun. 24, 2010

(51) Int. Cl.
*H05B 37/02* (2006.01)

(52) U.S. Cl. ........................... 315/307; 363/97; 363/147

(58) Field of Classification Search .............. 315/209 R, 315/224–226, 291, 307, 308, 361; 363/2, 363/97, 131, 147

See application file for complete search history.

(56) References Cited

U.S. PATENT DOCUMENTS

| | | | | |
|---|---|---|---|---|
| 5,313,381 | A * | 5/1994 | Balakrishnan | 363/147 |
| 6,324,079 | B1 * | 11/2001 | Collmeyer et al. | 363/21.15 |
| 6,775,164 | B2 * | 8/2004 | Wong et al. | 363/147 |
| 7,321,206 | B2 * | 1/2008 | Kang et al. | 315/291 |
| 2003/0174005 | A1 * | 9/2003 | Latham et al. | 327/172 |
| 2010/0052631 | A1 * | 3/2010 | Wu et al. | 323/266 |

* cited by examiner

*Primary Examiner* — Jacob Y Choi
*Assistant Examiner* — Jimmy Vu
(74) *Attorney, Agent, or Firm* — Muncy, Geissler, Olds & Lowe, PLLC

(57) ABSTRACT

The present invention mainly discloses low power non-isolated driver that can be used for LED lighting and other non-isolated power supply appliance, in which the input side is connected to an AC or DC input, a PWM control circuit is connected to the buck converter switch, a capacitor filters the output voltage ripple and an output voltage/current control circuit provides feedback signal to the PWM control circuit. The present invention has such features of less component number, low total cost, high reliability, and better line/load regulation.

3 Claims, 4 Drawing Sheets

LOW POWER NON-ISOLATED DRIVER

FIELD OF THE INVENTION

The present invention is related to low power non-isolated driver used for LED lighting and other non-isolated power supply appliance.

BACKGROUND OF THE INVENTION

LED lighting market is growing very fast and becoming more and more important. For the AC input source, most LED drivers adopt switching mode power supply (SMPS) based on flyback topology. The flyback SMPS circuit usually consists of AC input, PWM control circuit, transformer and constant voltage/current control circuit, wherein the output voltage/current control circuit are coupled through an optical coupling element to the primary side PWM control circuit. The PWM control circuit adjusts the switching duty cycle when line voltage or load is changed, so constant output current or voltage can be realized.

However, the cost of flyback SMPS circuit is relatively high and the total system size is big. For home appliance, it is ideal that the LED lighting driver is compact and can be placed in the lamp holder like CFL (compact fluorescent lamp). Thus the whole LED lighting system's installation will be easy. Also for compact LED lighting driver, isolating may not be needed if plastic lamp holder is used.

Therefore, it is necessary to provide new cost down solutions with less component count, small print circuit board size and better price/performance ratio.

SUMMARY OF THE INVENTION

The present invention is to provide basic cost down solutions for low power non-isolated LED driver application with higher system reliability, better line/load regulation, and short circuit protection characteristic.

The present invention provides a non-isolated LED lighting solution based on buck topology, in which the input side is connected to an AC or DC input, a PWM control circuit is connected to the buck converter switch, a capacitor filters the output voltage ripple and an output voltage/current control circuit provides feedback signal to the PWM control circuit.

The present invention is based on a low cost PWM control circuit with emitter switched architecture. The current mode PWM control circuit contains P1, P2 and P3 terminals. The P1 terminal is to produce switching pulse which can be connected to the emitter of NPN transistor or the source of MOSFET, the P2 terminal is used for both bias supply and feedback control, the P3 terminal is the reference ground of the PWM control circuit.

The present invention provides an output voltage/current control circuit employing a low voltage PNP transistor and zener diode to compose voltage sense error signal amplification circuit, a resistor and a low voltage NPN transistor to compose current sense and amplification circuit, or adopt two resistors to form output voltage sensing circuit.

The present invention has such features of less component number, low total cost, high reliability, and better line/load regulation.

BRIEF DESCRIPTION OF THE DRAWINGS

The present invention detailed is illustrated by way of example and not limitation in the accompanying figures.

DETAILED DESCRIPTION OF THE PREFERRED EMBODIMENTS

The present invention is a low power non-isolated driver which provides a basic cost down solutions for low power non-isolated LED driver application with higher system reliability, better line/load regulation, and short circuit protection characteristic. In particular, the present invention provides a non-isolated LED driver with approximately constant current and constant voltage characteristic based on a PWM control circuit.

Figure 1:
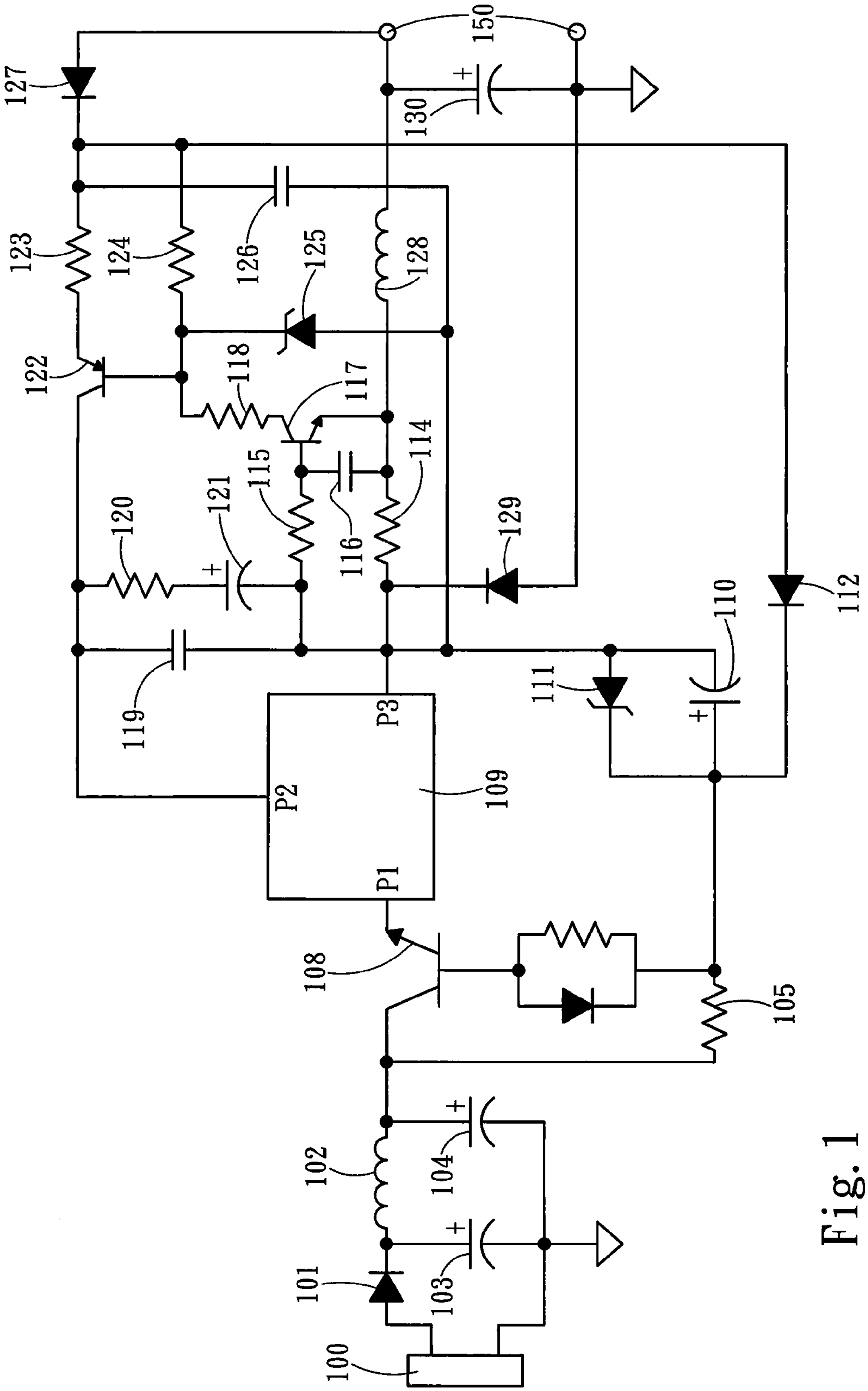
FIG. 1 shows one embodiment of low power non-isolated driver that has an approximately constant output current and output voltage clamping characteristic in accordance with the teachings of the present invention.

FIG. 1 shows the first embodiment of a low power non-isolated driver that has an approximately constant current and output voltage clamping characteristic of the present invention. The AC or DC input 100 is rectified by diode 101 and filtered by capacitor 103, inductor 102 and capacitor 104. Then the high DC voltage is converted to a low voltage DC output 150 by a switch 108, diode 129, inductor 128 and filtered by the output capacitor 130. The switch can be a high voltage transistor or a MOSFET which emitter terminal or source terminal is connected to a PWM control circuit 109.

Figure 2:
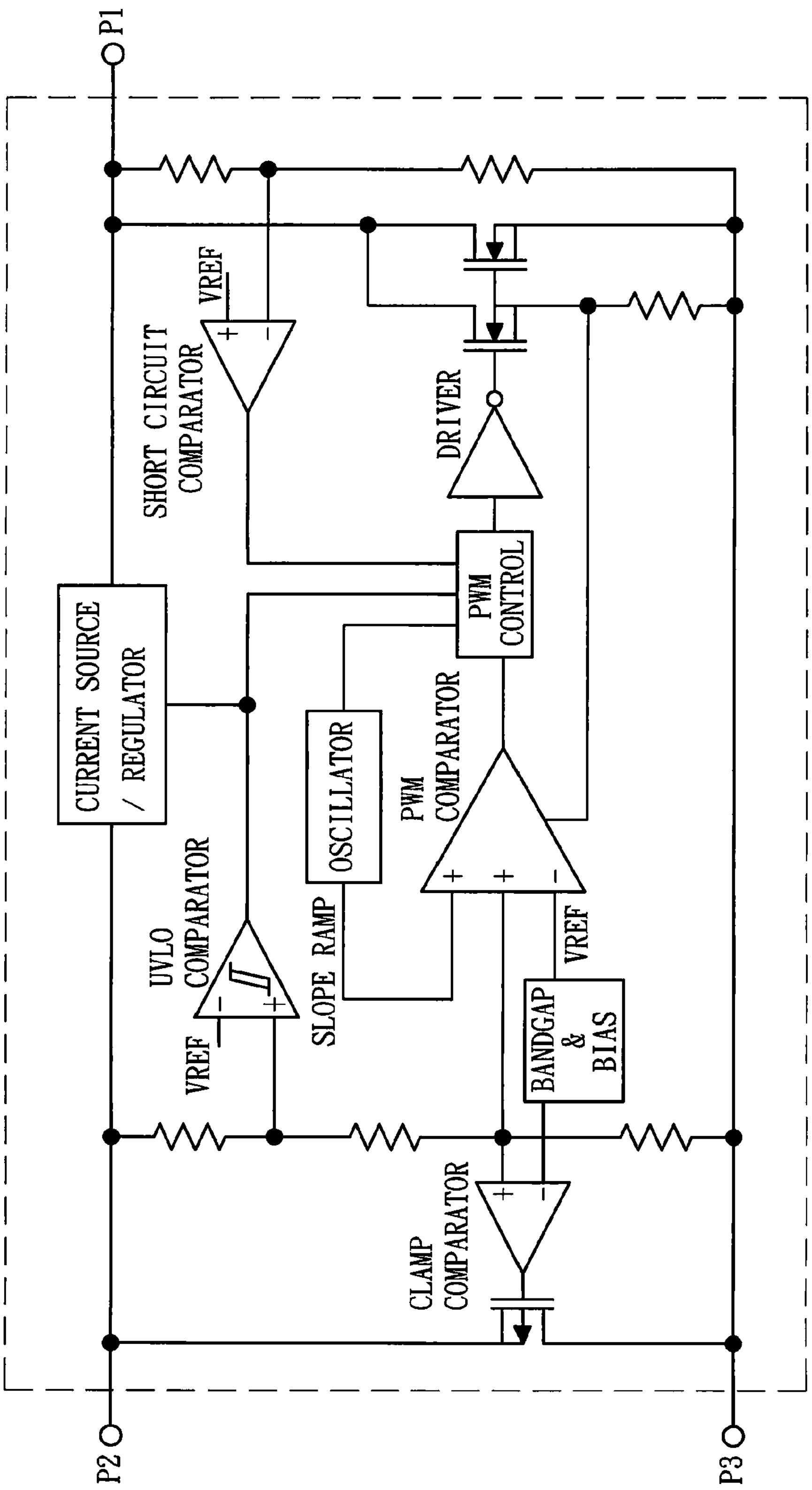
FIG. 2 shows the function block of the PWM control circuit.

FIG. 2 is the function block of the mentioned PWM control circuit. Its main function circuits include: under voltage lockout with low startup current; precise voltage reference for internal comparators; PWM comparator with current limit control, feedback signal and band-gap input; short circuit comparator.

The current mode PWM controller contains P1, P2 and P3 terminals. The P1 terminal is to produce switching pulse which can be connected with the emitter of NPN transistor or the source of MOSFET, the P2 terminal is used for both bias supply and feedback control, the P3 is the reference ground of the PWM control circuit.

See FIG. 1 and FIG. 2. During start up, start up current through resistors 105 charges capacitor 110, and also brings up P1 pin voltage of the PWM control circuit 109 through transistor 108 BE junction. The internal regulator of the PWM control circuit 109 will charge P2 pin voltage from P1 pin. When P2 voltage reaches the start up voltage, the regulator sourcing current will be stopped by internal UVLO comparator. Then the PWM control circuit 109 starts to output PWM signal at P1 pin and controls the switch 108 turning on and off.

When the switch 108 turned on, input current will flow through rectifier 101, switch 108, PWM control circuit 109, current sense resistor 114 and inductor 128 to the output. The current flow through PWM control circuit 109 is converted to a voltage by an internal resistor, and this voltage will compare with VREF by short circuit comparator. If output short circuit happens, the output current is limited by the PWM control circuit 109. When the switch 108 turned off, the inductor 128 current will flow through fast recovery diode 129 and transfer energy to the output.

The output voltage/current control circuit is composed of components from 114 to 127. When the switch 108 turned off, the diode 127 will turn on and voltage on capacitor 126 will be almost equal to the output DC voltage. The capacitor 126 voltage is compared with zener diode 125 clamping voltage and amplified by the low voltage small signal PNP transistor 122, then filtered by compensation resistor 120, capacitor 119, capacitor 121 and feedback to the P2 of the PWM control circuit 109. If the DC output 150 voltage is higher than the reference value, the P2 voltage of PWM control circuit 109 will also becomes higher and the PWM control circuit 109 will reduce the converter switching duty cycle or comes into skip cycle mode and low down the DC output 150 voltage. So the constant output voltage control is realized. The inductor 128 current is sensed by resistor 114, filtered by resistor 115, capacitor 116 and drives the low voltage small signal NPN transistor 117 BE junction. If the resistor 114 voltage higher than transistor 117 BE junction conduction voltage (about 0.7V), the transistor 117 will turn on and pull down the transistor 122 base junction voltage and output DC voltage will be reduced. So the output current is limited and approximately constant current control is realized.

When the switch 108 turned off, the inductor 128 energy will also charge capacitor 110 through diode 127 and 112. The capacitor 110 will discharge and provide driving energy to the switch 108 when the PWM control circuit 109 turns on the switch 108. The capacitor 110 voltage is clamped by zener diode 111 to prevent high voltage on 110 at very low or no load condition.

Figure 3:
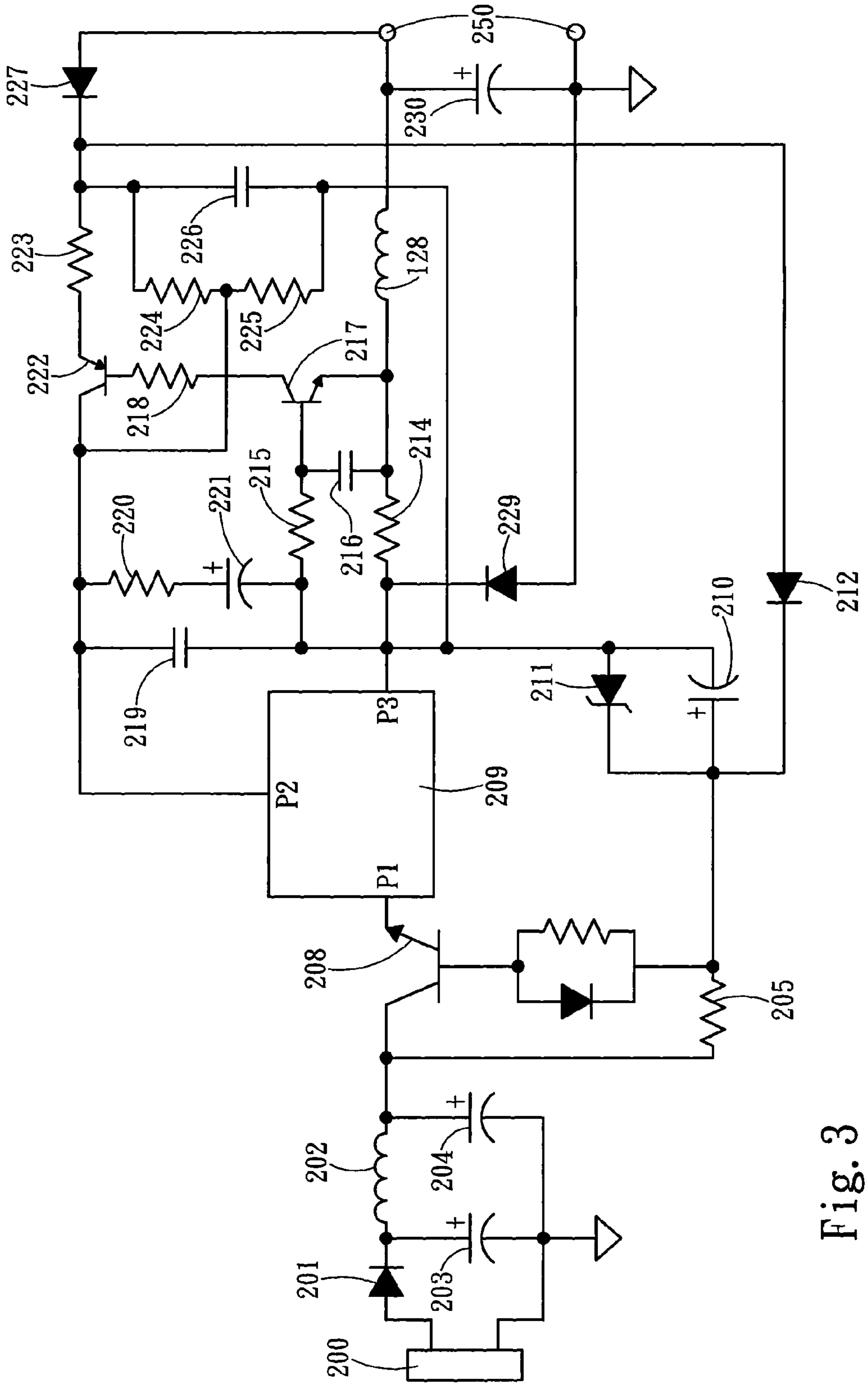
FIG. 3 shows another embodiment of low power non-isolated driver that has an approximately constant current and output voltage clamping characteristic in accordance with the teachings of the present invention.

FIG. 3 shows another embodiment of a non-isolated power supply of the present invention. The difference between FIG. 3 and FIG. 1 is the output voltage/current control circuit. In FIG. 3, the output DC voltage is sensed by two resistors 224 and 225. There is no output voltage sensing error amplification circuit, so the output voltage precision of line/load regulation is not as good as FIG. 1.

Figure 4:
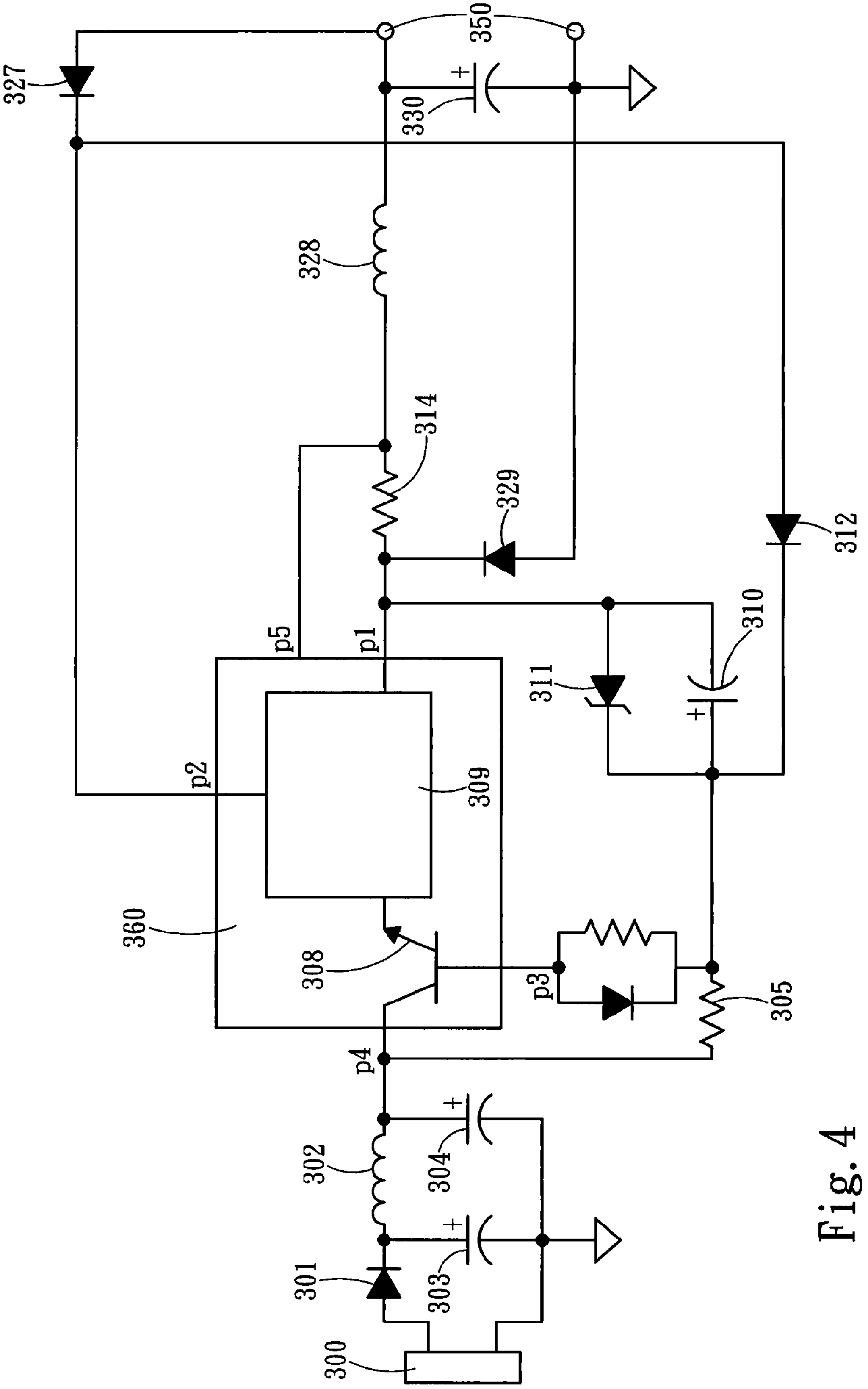
FIG. 4 shows the embodiment of low power non-isolated driver that the transistor, PWM control circuit and the output voltage/current control circuit are integrated.

FIG. 4 is the solution with the integrated transistor, PWM control circuit and output voltage/current control circuit. The integrated circuit 360 has five terminals p1, p2, p3, p4 and p5. The integration of the switch 308, PWM control circuit and output voltage/current control circuit 309 can reduce the whole system size and improve the system reliability.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A low power non-isolated driver comprising a rectify circuit and a buck converter, the buck converter comprising:

a switch connected with the rectify circuit;

a PWM control circuit including a P1 terminal, a P2 terminal and a P3 terminal, the P1 terminal connected with the switch, the P2 terminal used for both bias supply and feedback control, and the P3 terminal being the reference ground of the PWM control circuit;

an output voltage/current control circuit connected respectively with the P2 and P3 terminals, the output voltage/current control circuit including a zener diode and a low voltage PNP transistor connected with each other to feedback a signal to the P2 terminal, and further including a resistor and a low voltage NPN transistor connected with each other to realize constant current control.

2. The low power non-isolated driver of claim 1, wherein the PWM control circuit is integrated with the switch.

3. The low power non-isolated driver of claim 1, wherein the output voltage/current control circuit further includes two resistors connected with each other to sense output DC voltage.

* * * * *